United States Patent
Sassi et al.

(10) Patent No.: US 9,650,212 B2
(45) Date of Patent: May 16, 2017

(54) UNIT FOR THE CONVEYANCE AND SORTED ALIGNMENT OF PRODUCTS

(71) Applicant: GIMA S.P.A., Zola Predosa (IT)

(72) Inventors: Fabio Sassi, Bologna (IT); Matteo Cinesi, Bologna (IT)

(73) Assignee: GIMA S.P.A., Zola Predosa (IT)

( * ) Notice: Subject to any disclaimer, the term of this patent is extended or adjusted under 35 U.S.C. 154(b) by 0 days.

(21) Appl. No.: 15/039,240

(22) PCT Filed: Nov. 12, 2014

(86) PCT No.: PCT/EP2014/074391
§ 371 (c)(1),
(2) Date: May 25, 2016

(87) PCT Pub. No.: WO2015/074930
PCT Pub. Date: May 28, 2015

(65) Prior Publication Data
US 2017/0036865 A1    Feb. 9, 2017

(30) Foreign Application Priority Data

Nov. 25, 2013  (IT) .............................. B02013A0642

(51) Int. Cl.
*B65G 47/24*    (2006.01)
*B65G 47/248*   (2006.01)
*B65G 47/84*    (2006.01)

(52) U.S. Cl.
CPC ......... *B65G 47/248* (2013.01); *B65G 47/846* (2013.01)

(58) Field of Classification Search
CPC .... B65G 47/248; B65G 47/244; B65G 29/00; B65G 47/24; B65G 2811/0626

(Continued)

(56) References Cited

U.S. PATENT DOCUMENTS 3,143,223 A * 8/1964 McIntyre ................ B65B 35/56
                                                414/788.3
3,462,912 A * 8/1969 Anderson ............... B65B 35/56
                                                198/374

(Continued)

FOREIGN PATENT DOCUMENTS

DE     2901019 B1    4/1980
DE     2947033 A1    5/1981

OTHER PUBLICATIONS

International Search Report issued Feb. 12, 2015 re: Application No. PCT/EP2014/074391; pp. 1-3; citing: DE 29 01 019 B1, DE 29 47 033 A1, US 3 583 544 A and US 4 067 433 A.

(Continued)

*Primary Examiner* — James R Bidwell
(74) *Attorney, Agent, or Firm* — Cantor Colburn LLP

(57) ABSTRACT

A unit for conveying and sorting products into alignment includes at least one conveyor belt and at least one surface for gathering products, arranged downstream the belt. At least two conveyor belts are arranged at different heights and convey the products according to a predefined arrangement. A lower belt leads to a carousel for picking up and transferring a product at a time into a conveyance channel that leads to the gathering surface. An upper belt includes at least one portion that surmounts an end of the lower belt arranged downstream the first carousel. The portion leads to an apparatus for overturning the products to transfer them onto the lower belt end, with an orientation, of the products, opposite the one adopted on the upper belt. The part is affected by a second carousel for picking up and transferring one product at a time into the conveyance channel.

8 Claims, 4 Drawing Sheets

(58) Field of Classification Search
USPC .................................. 198/374, 398, 406, 402
See application file for complete search history.

(56) References Cited

U.S. PATENT DOCUMENTS

| | | | |
|---|---|---|---|
| 3,583,544 A | | 6/1971 | Prodzenski |
| 4,067,433 A | | 1/1978 | Phipps |
| 6,098,782 A | * | 8/2000 | Hardage ................ A21C 9/085 |
| | | | 198/403 |
| 7,681,374 B2 | * | 3/2010 | Schulte .................. B65B 35/58 |
| | | | 198/374 |
| 8,640,853 B2 | * | 2/2014 | Arimatsu ................ B65B 35/24 |
| | | | 198/401 |
| 2013/0042111 A1 | * | 2/2013 | Fiske .................... H04L 9/3239 |
| | | | 713/170 |

OTHER PUBLICATIONS

Written Opinion issued Feb. 12, 2015 re: Application No. PCT/EP2014/074391; pp. 1-4; citing: DE 29 01 019 B1, DE 29 47 033 A1, US 3 583 544 A and US 4 067 433 A.

* cited by examiner

UNIT FOR THE CONVEYANCE AND SORTED ALIGNMENT OF PRODUCTS

CROSS-REFERENCE TO RELATED APPLICATIONS

This application is related to and claims the benefit of Italian Patent Application No. BO2013A000642, filed on Nov. 25, 2013 and PCT Application No. PCT/EP2014/074391, filed on Nov. 12, 2014, the contents of which are herein incorporated by reference in their entirety.

TECHNICAL FIELD

The present disclosure relates to a unit for the conveyance and sorted alignment of products.

BACKGROUND

In machines used for packaging and/or processing finished products and/or semi-finished products, it is often necessary to transfer the products from an upstream station to a downstream station.

A simple conveyor belt is adapted to carry out this type of activity in all cases in which the quantity of products to be transferred per unit of time is lower than preset limits.

In cases where greater transfer speeds are required, it is possible to combine a plurality of belts arranged side by side.

Obviously, the arrangement side by side thereof results in an increase of the overall encumbrances.

This solution however suffers numerous problems in that it may not allow an optimal sorted arrangement of products at the entry point of the downstream station.

It should be noted that, in many cases, if the products do not arrive at the downstream station with the necessary arrangement, the latter will not be able to operate on them correctly.

SUMMARY

The aim of the present disclosure is to solve the above mentioned drawbacks, by providing a unit for the conveyance and sorted alignment of products at high speed.

Within this aim, the disclosure provides a unit for the conveyance and sorted alignment of products which offers reduced space occupation.

The disclosure also provides a unit for the conveyance and sorted alignment of products which arranges the products optimally for the operation of the downstream station.

The present disclosure further provides a unit for the conveyance and sorted alignment of products which is low cost, easily and practically implemented and safe in use.

The disclosure provides a unit for the conveyance and sorted alignment of products, of the type comprising at least one conveyor belt and at least one surface for gathering the products, which is arranged downstream of said at least one belt, characterized in that said conveyor belts are at least two in number, arranged at different heights and intended to convey the products according to a common predefined arrangement, a lower belt leading to a first carousel for picking up a single product at a time and for transferring it into a conveyance channel that leads to said gathering surface, an upper belt comprising at least one portion thereof that surmounts an end part of said lower belt which is arranged downstream of said first carousel, said portion leading to an apparatus for overturning the products in order to transfer them onto said end part of said lower belt, with an orientation, of said products on said part, that is the opposite of the one adopted on said upper belt, said part being affected by a second carousel for picking up a single product at a time and for transferring it into said conveyance channel that leads to said gathering surface.

BRIEF DESCRIPTION OF THE DRAWINGS

Further characteristics and advantages of the disclosure will become better apparent from the detailed description that follows of a preferred, but not exclusive, embodiment of the unit for the conveyance and sorted alignment of products according to the disclosure, which is illustrated by way of non-limiting example in the accompanying drawings wherein.

DETAILED DESCRIPTION OF THE DRAWINGS

Figure 1:
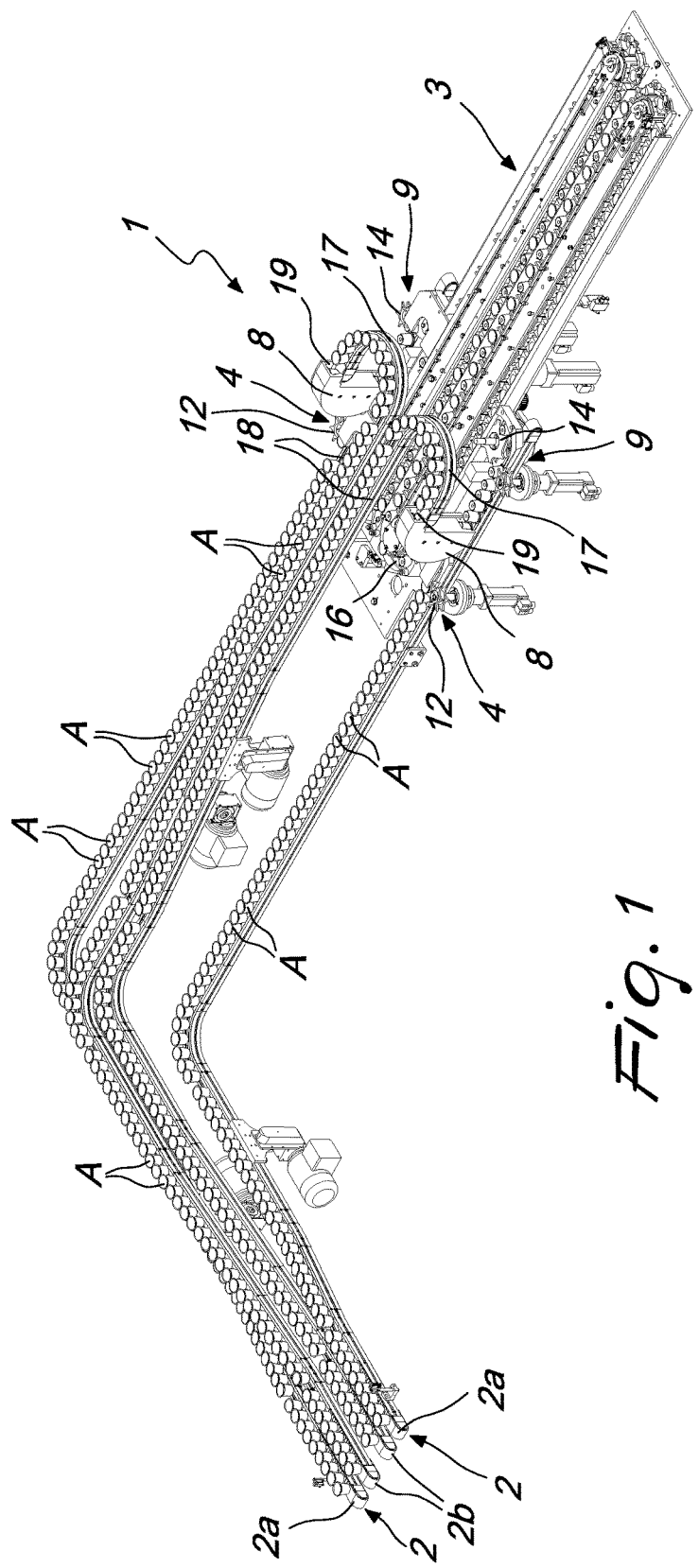
FIG. 1 is a schematic perspective view of a unit for the conveyance and sorted alignment of products according to the disclosure.
Figure 2:
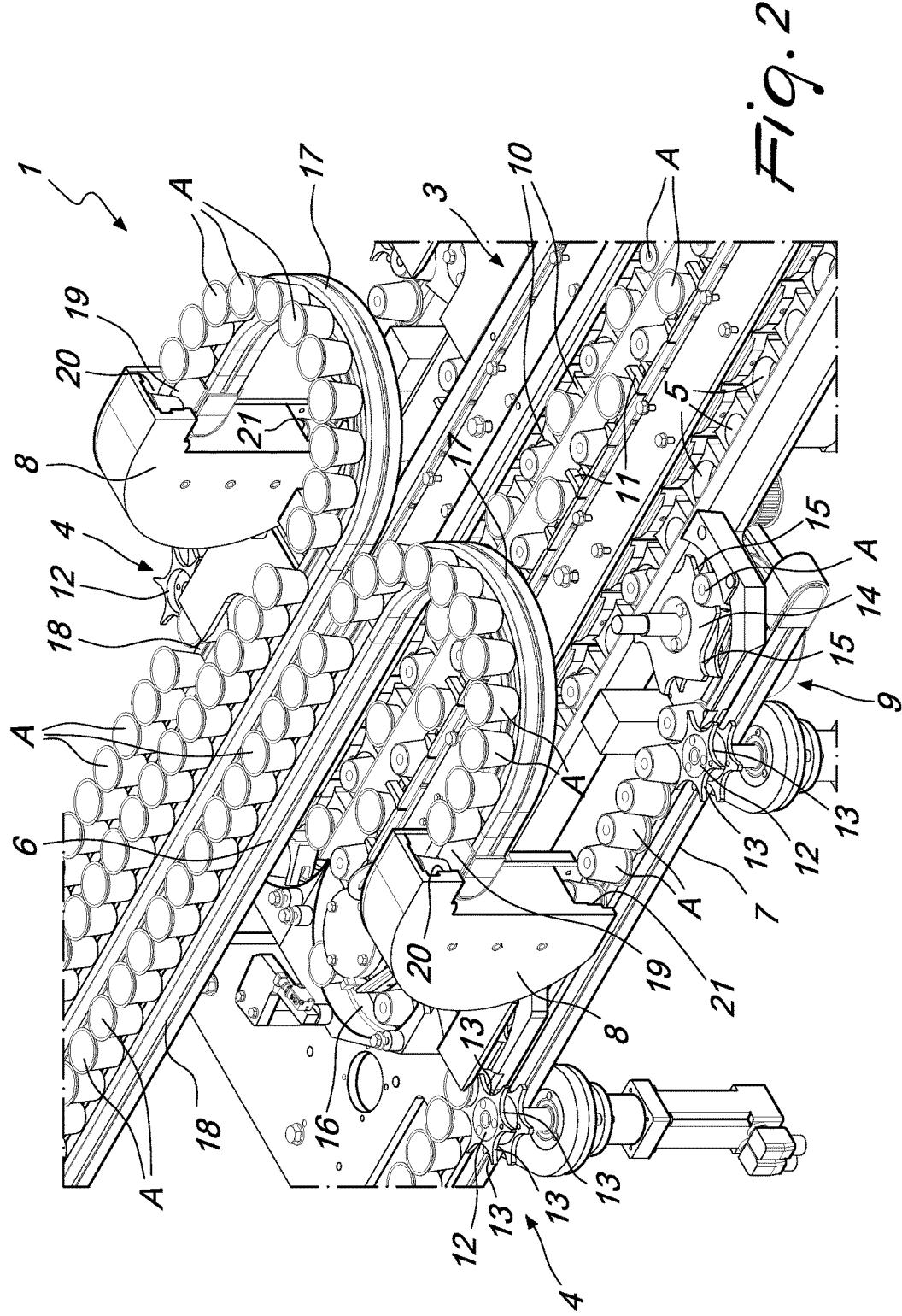
FIG. 2 is an enlarged view of a detail of FIG. 1.
Figure 3:
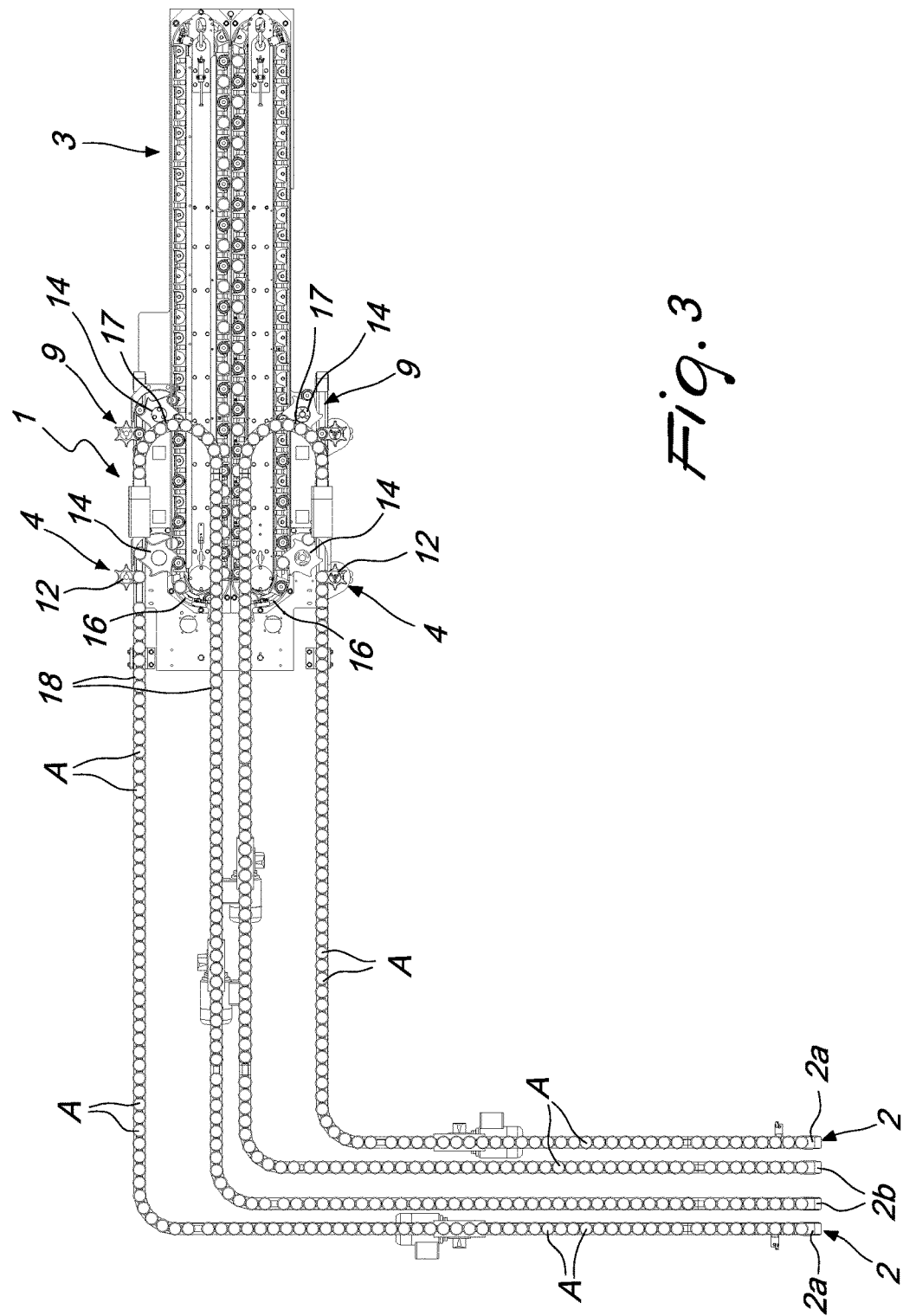
FIG. 3 is a view from above of the unit in FIG. 1.
Figure 4:
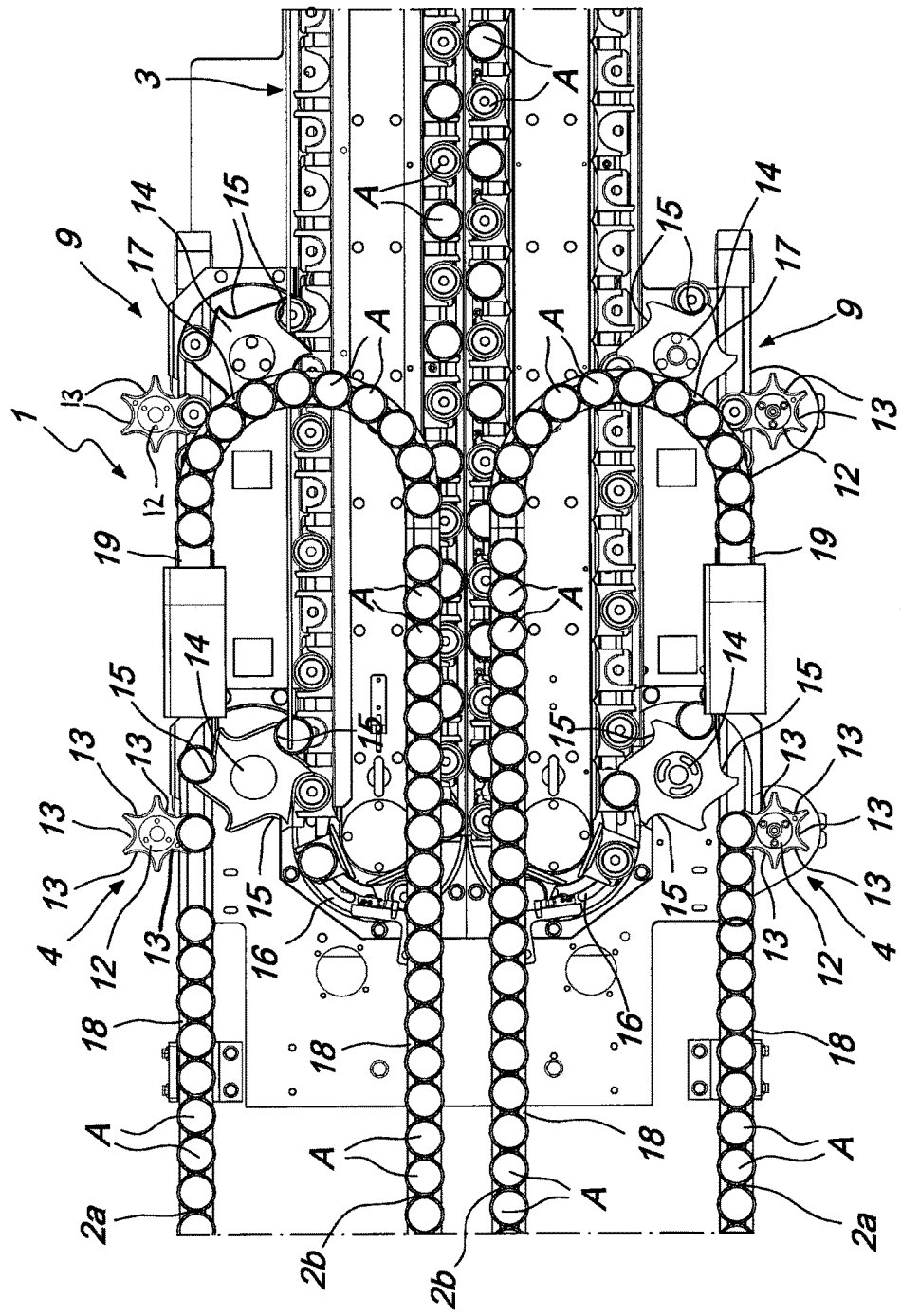
FIG. 4 is an enlarged view of a detail of FIG. 3.

With particular reference to the figures, the reference numeral 1 generally designates a unit for the conveyance and sorted alignment of products A.

The unit 1 comprises at least one conveyor belt 2 and at least one surface 3 for gathering the products A, which is arranged downstream of the at least one belt 2.

According to the disclosure, the conveyor belts 2 are at least two in number, arranged at different heights and intended to convey the products A according to a common predefined arrangement.

A lower belt 2a leads to a first carousel 4 for picking up a single product A at a time and for transferring it into a conveyance channel 5 that leads to the gathering surface 3.

An upper belt 2b comprises at least one portion 6 thereof that surmounts an end part 7 of the lower belt 2a which is arranged downstream of the first carousel 4.

The portion 6 leads to an apparatus 8 for overturning the products A in order to transfer them onto the end part 7 of the lower belt 2a, with an orientation, of such products A on the part 7, that is the opposite of the one adopted on the upper belt 2b.

The part 7 is affected by a second carousel 9 for picking up a single product A at a time and for transferring it into the conveyance channel 5 that leads to the gathering surface 3.

It should be noted that, according to a particular embodiment of undoubted practical and applicative interest, the conveyor belts 2 are at least four in number, and define at least two pairs, each constituted by a lower belt 2a and an upper belt 2b, which are arranged mutually side by side and converge on respective side-by-side and proximate tracks 10 and 11 of the gathering surface 3 for the arrangement thereon of at least two series of products A with an alternating orientation in a longitudinal direction, along a respective track 10 or 11, and in a transverse direction, at each perpendicular cross-section of the tracks 10 and 11 that comprises respective products A.

In essence thus, on the gathering surface 3, within the tracks 10 and 11, the products A will be mutually arranged with alternating and opposing orientation both in a longitudinal direction and in a transverse direction.

It should be noted that the products A can have any shape: their conveyance will occur, in any case, while keeping a first face thereof resting on the respective belt 2 (assuming an "upright" orientation). Following the movement thereof executed by the unit 1 according to the disclosure, some products A can end up within the tracks 10 and 11 resting on a face thereof which is opposite to the first face mentioned previously (thus assuming an "upside-down" orientation).

Along each track 10 and 11 the products will thus be arranged alternately with "upright" and "upside-down" orientation.

Furthermore, at each product A arranged with "upright" ("upside-down") orientation on the track 10, there will be a product A arranged with "upside-down" ("upright") orientation on the track 11.

It should further be noted that each carousel 4 and 9 comprises a rotatable star conveyor 12, which affects the lower belt 2a and is provided with a plurality of radial seats 13 for the temporary accommodation of a single product A.

Downstream of the star conveyor 12, each carousel 4 and 9 comprises a disk 14, which is pivoted rotatably between the lower belt 2a and the conveyance channel 5 and is provided with contoured radial expansions that define consecutive recesses 15 for the accommodation of a single product A released by the star conveyor 12 onto the belt 2a, with consequent transfer thereof into the conveyance channel 5.

Each conveyance channel 5 can preferably comprise a motorized chain provided with a plurality of consecutive and contiguous seats, each intended to accommodate a single product A with "upright" or "upside-down" orientation (it should be noted that the products A can end up on the conveyance channel all with the upright arrangement, all with the upside-down arrangement, or alternating, individually or according to groups constituted by a preset number of products with the same arrangement).

It should further be noted that, according to the embodiment that has two pairs of conveyor belts 2 (each pair constituted by a lower belt 2a and an upper belt 2b), the conveyance channels 5 are two in number and are mutually parallel, each one being provided with a bend 16 for connection to a respective track 10 or 11 of the gathering surface 3.

It should conveniently be noted that, with particular reference to a preferred (but not exclusive and thus not limiting the scope of protection of the present disclosure) embodiment, which is shown by way of example in the accompanying drawings, the lower belts 2a are arranged externally with respect to the upper belts 2b.

Upstream of each first carousel 4, each upper belt 2b comprises a substantially semicircular lane 17 for connection between its segment 18 that is substantially aligned with the first carousel 4 and its portion 19 that surmounts the end part 7 of the lower belt 2a that is arranged downstream of the first carousel 4.

The semicircular lane 17 enables the inversion of the advancement direction of the products along the belt 2b affected by the lane 17.

It should further be noted that the at least one substantially semicircular lane 17 comprises an input opening arranged at the end of the segment 18 and an output opening leading to the portion 19: it should again be noted that the direction of the products A passing through the input opening will be parallel to the direction of the products A passing through the output opening, the transit directions of the products A in the two openings will be mutually opposite (the presence of the lane 17 is in fact necessary to invert the motion of the products A in order to be able to correctly convey them to the apparatus 8 for overturning).

In order to ensure an optimal and efficient operation of the unit 1, the at least one apparatus 8 for overturning the products A, in order to transfer them onto the end part 7 of the lower belt 2a, has a substantially semicircular guiding path for the products A and comprises an input opening 20 and an output opening 21 for the products A.

The direction of products A passing through the input opening 20 is parallel to the direction of the products A passing through the output opening 21; the transit directions of the products A in the two openings 20 and 21 and their orientation being mutually opposite.

In essence the products A passing through the input opening 20 will have an "upright" ("upside-down") orientation and will advance inside the apparatus 8, while those passing through the output opening 21 will have an "upside-down" ("upright") orientation and will move away from the apparatus 8.

It should be noted that the products A can preferably be capsules for use with espresso coffee machines.

In such case each product A (capsule) will have a substantially frustum-shaped shape structure (optionally also partially contoured, rounded or generically curved) and will comprise an upper frame (to which the flap closing the capsule will be fixed). The figures accompanying this discussion show such implementation possibility.

The possibility is not ruled out however of using the unit 1 for the conveyance and sorted alignment of other types of products that can necessitate alternated sorting (including with bidirectional alternation, i.e. both in a longitudinal direction, and in a transverse direction).

Advantageously the present disclosure solves the above mentioned problems, by providing a unit 1 for the conveyance and sorted alignment of products A which can function at extremely high speed in that it involves the combination of a plurality of belts 2, all leading to a same gathering surface 3 (from which the successive processing stations can then retrieve groups of products A in order to execute successive operations on them).

Conveniently the unit 1 according to the disclosure offers contained encumbrances, in that the belts 2a and 2b are at least partially overlapping, thus limiting the lateral space occupation.

Conveniently the unit 1 according to the disclosure arranges the products A optimally for the operation of the downstream station.

As previously explained above, in fact, the products A will be arranged on the gathering surface 3 in such a way as to be easily retrievable by the downstream station according to an order that conforms to the operations that will be executed subsequently.

Positively the unit 1 is, with respect to other, conventional implementation solutions, low cost and is further easily and practically implemented and safe in use.

The disclosure thus conceived is susceptible of numerous modifications and variations. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The invention claimed is:

1. A unit for the conveyance and sorted alignment of products, of the type comprising at least one conveyor belt and at least one surface for gathering the products, which is arranged downstream of said at least one belt, wherein said conveyor belts are at least two in number, arranged at different heights and intended to convey the products according to a common predefined arrangement; a lower belt of said conveyor belts leading to a first carousel for picking up a single product at a time and for transferring it into a conveyance channel that leads to said gathering surface, an upper belt of said conveyor belts comprising at least one portion thereof that surmounts an end part of said lower belt which is arranged downstream of said first carousel, said at least one portion leading to an apparatus for overturning the products in order to transfer them onto said end part of said lower belt, with an orientation, of said products on said end part, that is the opposite of the one adopted on said upper belt, said end part being affected by a second carousel for picking up a single product at a time and for transferring it into said conveyance channel that leads to said gathering surface.

2. The conveyance and alignment unit according to claim 1, wherein said conveyor belts are at least four in number, and define at least two pairs, each constituted by a lower belt and an upper belt, which are arranged mutually side by side and converge on respective side-by-side and proximate tracks of said gathering surface for the arrangement thereon of at least two series of products with an alternating orientation in a longitudinal direction, along a respective track, and in a transverse direction, at each perpendicular cross-section of said tracks that comprises respective products.

3. The conveyance and alignment unit according to claim 1, wherein each carousel comprises a rotatable star conveyor, which affects said lower belt and is provided with a plurality of radial seats for the temporary accommodation of a single product and, downstream of said star conveyor, a disk, which is pivoted rotatably between said lower belt and said conveyance channel, and is provided with contoured radial expansions that define consecutive recesses for the accommodation of a single product released by said star conveyor onto said belt, with consequent transfer thereof into said conveyance channel.

4. The conveyance and alignment unit according to claim 1, wherein each conveyance channel comprises a motorized chain that is provided with a plurality of consecutive and contiguous seats, each intended to accommodate a single product with an upright or upside-down orientation.

5. The conveyance and alignment unit according to claim 1, wherein said conveyance channels are two in number and are mutually parallel, each one being provided with a bend for connection to a respective track of said gathering surface.

6. The conveyance and alignment unit according to claim 1, wherein said lower belts are arranged externally with respect to said upper belts upstream of said first carousel, each upper belt comprising a substantially semicircular lane for connection between a segment thereof that is substantially aligned with said first carousel and a portion thereof that surmounts said end part of said lower belt that is arranged downstream of said first carousel.

7. The conveyance and alignment unit according to claim 6, wherein said at least one substantially semicircular lane comprises an input opening and an output opening, the direction of the products that pass through said input opening being parallel to the direction of the products that pass through said output opening, the transit directions of the products in the two openings being mutually opposite.

8. The conveyance and alignment unit according to claim 1, wherein said at least one apparatus for overturning the products, for transferring them onto said end part of said lower belt, has a substantially semicircular guiding path for said products and comprises an input opening and an output opening, a direction of the products that pass through said input opening being parallel to a direction of the products that pass through said output opening, the transit directions of the products in the two openings and their orientation being mutually opposite.

* * * * *